United States Patent Office 2,852,544
Patented Sept. 16, 1958

2,852,544

PREPARATION OF ORGANOMETALLIC HALIDES

Gene Nowlin, Glen Burnie, Md., and Harold D. Lyons, Bartlesville, Okla., assignors to Phillips Petroleum Company, a corporation of Delaware No Drawing. Application October 26, 1955
Serial No. 543,013

8 Claims. (Cl. 260—448)

This invention relates to the preparation of organometallic halides. In one aspect, the invention relates to a process for preparing alkylaluminum halides.

Organometallic halides are very useful in the synthesis of various types of organic compounds. These compounds are of particular significance as components of catalyst systems employed in the polymerization of monoolefins.

Alkyl halides are known to react with aluminum to yield a mixture of dialkylaluminum halides and alkylaluminum dihalides, frequently referred to as alkylaluminum sesquihalides. The reaction of an alkyl halide with aluminum can be expressed by the following general equation:

$$3RX + 2Al \rightarrow R_2AlX + RAlX_2$$

wherein R is an alkyl radical and X is a halogen, including fluorine, chlorine, bromine and iodine. When the alkyl halide is ethyl chloride, the product consists of a mixture of diethylaluminum chloride and ethylaluminum dichloride, also referred to as ethylaluminum sesquichloride. When an alkyl halide, such as methyl or ethyl halide, is brought in the gaseous state into contact with aluminum at atmospheric pressure, a white solid forms which melts and vaporizes at a temperature below the temperature employed in the reaction. The accumulation of this volatile solid results in plugging of the reactor outlet, building up of pressure in the reactor, and eventual blow-outs.

It is an object of this invention to provide an improved process for preparing organometallic halides, which eliminates the disadvantages of conventional processes.

Another object of the invention is to provide an improved process for the preparation of reaction products of methyl and ethyl halides with aluminum.

Other and further objects and advantages of the invention will become apparent to one skilled in the art upon consideration of the following disclosure.

We have now discovered that the above-described difficulties encountered when reacting alkyl halides with aluminum can be avoided by proceeding in accordance with the process of this invention. In a broad aspect, the instant invention, when preparing alkylaluminum sesquihalide, comprises introducing initially into a reactor aluminum and a small quantity of some previously prepared alkylaluminum sesquihalide and thereafter introducing an alkyl halide below the surface of the sesquihalide. When operating in this manner, it has been found that the reaction proceeds smoothly with none of the troublesome, volatilizable solid being formed. While the present invention is especially applicable to and will be discussed specifically hereinafter with relation to the preparation of alkylaluminum halides, it is not intended to so limit the invention. Thus, the process of this invention is applicable to the preparation of alkylmetal halides corresponding to the formula $R_mMX_n$, wherein R is an alkyl radical, M is a metal selected from the group consisting of aluminum, gallium, indium, thallium and beryllium, X is a halogen, and $m$ and $n$ are integers, the sum of $m$ and $n$ being equal to the valence of metal M.

In accordance with a preferred embodiment of this invention, a reactor is employed which is provided with a stirrer, a suitable condensing system through which off gases are allowed to pass, an inlet tube for an inert gas, such as nitrogen, an induction tube leading to the bottom of the reactor for introduction of the alkyl halide, and a means for registering temperature. The reactor is initially purged with purified nitrogen which is thereafter passed slowly through the system throughout the reaction. Aluminum, in the form of turnings or other suitable form which will provide a large surface area, is charged to the reactor together with a relatively small quantity of some previously prepared alkylaluminum sesquihalide. In order to avoid a product contaminated with extraneous materials, it is preferred to charge to the reactor alkylaluminum halides corresponding to the product being prepared. The alkylaluminum sesquihalide, which is a liquid material, serves as the medium for the reaction. The reactor's contents are heated to a temperature in the range of 120–190° C. after which the alkyl halide is introduced into the reactor below the surface of the reaction medium. The alkyl halides are gases at the reaction temperature. The reactants are stirred, and the alkyl halide is added at such a rate that flooding of the condenser does not occur and the reaction temperature remains at the desired level, i. e., at a temperature between about 120 and 190° C. The addition of the alkyl halide is terminated when it ceases to be consumed as evidenced by a drop in the reaction temperature. Any suitable means, such as distillation, can be used for the purification of the product.

In another preferred embodiment of the invention, the aluminum only is initially charged to the reactor after which an alkyl halide is introduced. The liquid material which first forms serves as the medium for the remainder of the reaction, and the alkyl halide is then introduced into the reactor below the surface of this material. Thus, except for the initial start-up period and during a major portion of the process, the alkyl halide is passed into the reactor below the surface of the reaction mixture therein. It is also within the scope of the invention to add a diluent, preferably a hydrocarbon, with the aluminum initially charged to the reactor. The diluent serves as the reaction medium during the commencement of the process, and the alkyl halide is initially introduced into the reactor below the surface of the diluent. Diluents which can be used include paraffins, cycloparaffins and/or aromatic hydrocarbons which are relatively inert, non-deleterious and liquid under conditions of the process. Examples of diluents which can be utilized are the octanes, the nonanes, the decanes, the hexadecanes, the heptadecanes, the octadecanes, cyclohexane, methylcyclohexane, benzene, toluene, xylene and the like. Mixtures of two or more of these diluents can also be employed.

It is to be understood that the process of this invention can be operated in a continuous manner as well as batchwise. If it is desired to operate the process batchwise, a major portion of the reaction mixture is transferred from the reactor to a separation means, such as a fractionating column, for purification of the product. A minor portion of the reaction mixture is allowed to remain in the reactor for use in the next operation, the quantity remaining being sufficient to cover the end of the induction tube. A fresh charge of metal is then introduced into the reactor, and the temperature is adjusted to the desired level. The alkyl halide is then charged to the system as described hereinbefore. When operating in a continuous manner, the metal and alkyl halide are continuously added to the reactor, the alkyl halide being introduced below the surface of the liquid therein. The reaction product is continuously withdrawn from the reaction zone, and an alkyl metal halide recovered therefrom. It is important for the successful operation of the process of this invention that no extraneous materials, which will retard or inhibit the reaction, be present in the alkyl halide and aluminum. In this regard, it is desirable that carbon dioxide, oxygen and moisture be excluded from the system. If the aforementioned precautions are observed, it is possible to obtain very high product yields.

A more comprehensive understanding of the invention may be obtained by referring to the following illustrative examples which are not intended, however, to be unduly limitative of the invention.

*Example I*

A glass reactor was used in this example and was provided with a stirrer, a water condenser through which acetone cooled to Dry Ice temperature was circulated, inlets for purified nitrogen and ethyl chloride, and a thermocouple well. The reactor was purged with purified nitrogen and charged with 350 grams of aluminum turnings and a trace of iodine. The reactor contents were heated to 150° C. and ethyl chloride was introduced while the mixture was being stirred. Nitrogen was kept flowing through the system at a slow rate to maintain an inert atmosphere in the reactor. Ethyl chloride was introduced above the surface of the reaction mixture at a rate sufficient to maintain the reaction temperature between 120 and 150° C. A liquid product formed but solidified when the addition of ethyl chloride was discontinued. The mixture was allowed to stand over night at room temperature (approximately 20–25° C. and an attempt was then made to resume the reaction by heating the mixture to 120° C. prior to the addition of more ethyl chloride. During the heating period, the solid material melted and vaporized at a temperature below 120° C. and then condensed on the walls of the outlet tube (condenser) causing it to become plugged. Sufficient pressure was created to cause blowouts at the inlet tubes. The condenser and all connections were cleaned, heating was continued, and ethyl chloride was introduced. However, the white solid continued to deposit in the outlet tube and cause a build-up of pressure in the reactor. Repeated cleaning of the reactor inlet and outlet tubes and all connections did not remedy the difficulty. There was no appreciable consumption of ethyl chloride during this period.

*Example II*

A reactor similar to that described in Example I was used in this example except that the inlet tube for the ethyl chloride reached nearly to the bottom of the reactor in order that it would be below the surface of the reaction mixture. The reactor was purged with purified nitrogen, and a slow but steady flow of nitrogen was continued throughout the reaction to maintain an inert atmosphere. The reactor was charged with 150 grams of aluminum turnings and the temperature was raised to 70° C. after which the addition of ethyl chloride was commenced. After the reaction started, ethyl chloride was introduced at such a rate that the condenser did not flood and the reaction temperature was maintained between 120 and 150° C. The product which first formed served as a medium for the remainder of the reaction. Addition of ethyl chloride was continued over an 8-hour period and was then stopped. The liquid product which formed remained liquid when the mixture was allowed to stand over night at room temperature. At the end of this period, the mixture was heated to 120° C. and addition of ethyl chloride was resumed, the rate being regulated as before to maintain the temperature between 120 and 150° C. When ethyl chloride ceased to be consumed, as evidenced by a decrease in temperature, addition was discontinued. Throughout this run there was no evidence of deposition of a white solid in the reactor or on the walls of the outlet tube.

All but approximately 100 cubic centimeters of the liquid product was removed from the reactor, care being taken to keep it in a nitrogen atmosphere. Material remaining in the reactor served as the medium for another run. Aluminum turnings (150 grams) were charged to the reactor, the mixture was heated to 100° C., and ethyl chloride was introduced below the surface of the mixture as before, with the temperature being maintained at 130° C. No further reaction with ethyl chloride was indicated after six hours. Again no white solid was deposited on the reactor walls or in the outlet tube. The major portion of the liquid product was removed and distilled at 72–75° C. at a pressure of 4 mm. mercury, care being taken to protect it with a nitrogen atmosphere. The purified product was a colorless liquid which had a chlorine content of 47.4 weight percent. The theoretical chlorine content for ethylaluminum sesquichloride is 42.6 weight percent and for ethylaluminum dichloride is 56.0 weight percent.

It will be apparent to those skilled in the art that variations and modifications of the invention can be made upon study of the foregoing disclosure. Such modifications are believed to be clearly within the spirit and scope of the invention.

We claim:

1. In a process for the preparation of alkyl metallic halides corresponding to the formula $R_mMX_n$, wherein R is a lower alkyl radical, M is a metal selected from the group consisting of aluminum, gallium, indium, thallium and beryllium, X is a halogen, and $m$ and $n$ are integers, each of which is greater than zero and the sum of $m$ and $n$ being equal to the valence of metal M, which comprises contacting one of said metals M in a reaction zone with a lower alkyl halide in the gaseous phase, the improvement comprising introducing said lower alkyl halide into said reaction zone below the surface of the reaction mixture formed therein; withdrawing reaction mixture from said reaction zone; and recovering lower alkyl metallic halides from said withdrawn reaction mixture.

2. The process of claim 1 in which said alkyl halide is methyl chloride and methylaluminum chlorides are recovered as the product of the process.

3. The process of claim 1 in which said alkyl halide is ethyl chloride and ethylaluminum chlorides are recovered as the product of the process.

4. A process for the preparation of lower alkylaluminum halides which comprises introducing into a reaction zone aluminum and a liquid material comprising lower alkylaluminum halides; heating the contents of said reaction zone to a temperature in the range of 120 and 190° C.; introducing a lower alkyl halide in the gaseous state into said reaction zone below the surface of said liquid material, said alkyl halide being introduced at such a rate that the reaction temperature is maintained in the aforementioned range; terminating the supply of said alkyl halide to said reaction zone when it ceases to be consumed as evidenced by a decrease in said reaction temperature; withdrawing reaction mixture from said reaction zone; and recovering lower alkylaluminum halides from said withdrawn reaction mixture.

5. The process of claim 4 in which said alkyl halide is methyl chloride and methylaluminum chlorides are recovered as the product of the process.

6. The process of claim 4 in which said alkyl halide is ethyl chloride and ethylaluminum chlorides are recovered as the product of the process.

7. In a process for the preparation of alkyl metallic halides corresponding to the formula $R_mMX_n$, wherein R is a lower alkyl radical, M is a metal selected from the group consisting of aluminum, gallium, indium, thallium and beryllium, X is a halogen, and $m$ and $n$ are integers, each of which is greater than zero and the sum of $m$ and $n$ being equal to the valence of metal M, which comprises contacting one of said metals M in a reaction zone with a lower alkyl halide in the gaseous phase, the improvement comprising introducing said lower alkyl halide into said reaction zone below the surface of the reaction mixture formed therein.

8. In a process for the preparation of alkyl metallic halides corresponding to the formula $R_mMX_n$, wherein R is a lower alkyl radical, M is a metal selected from the group consisting of aluminum, gallium, indium, thallium and beryllium, X is a halogen, and $m$ and $n$ are integers, each of which is greater than zero and the sum of $m$ and $n$ being equal to the valence of metal M, which comprises contacting one of said metals M in a reaction zone with a lower alkyl halide in the gaseous phase, the improvement comprising introducing said metal M into said reaction zone containing a liquid material comprising a diluent; and introducing said lower alkyl halide into said reaction zone below the surface of said liquid material.

References Cited in the file of this patent

UNITED STATES PATENTS 2,691,668     Ziegler et al. _____ Oct. 12, 1954

OTHER REFERENCES

Grosse et al.: Journ. Org. Chem., vol. 5 (1940), pp. 106–121.